United States Patent
Pifferi (10) Patent No.: US 11,081,880 B2
(45) Date of Patent: Aug. 3, 2021

(54) WIRELESS POWER SYSTEM WITH PROTECTION FROM OVERVOLTAGE CONDITIONS

(71) Applicant: Datalogic IP Tech, S.r.l., Bologna (IT)

(72) Inventor: Marco Pifferi, Bologna (IT)

(73) Assignee: Datalogic IP Tech, S.r.l.

( * ) Notice: Subject to any disclaimer, the term of this patent is extended or adjusted under 35 U.S.C. 154(b) by 442 days.

(21) Appl. No.: 16/186,280

(22) Filed: Nov. 9, 2018

(65) Prior Publication Data

US 2020/0153239 A1   May 14, 2020

(51) Int. Cl.
| | |
|---|---|
| *H02H 9/00* | (2006.01) |
| *H02J 50/90* | (2016.01) |
| *H02J 7/02* | (2016.01) |
| *H02J 50/10* | (2016.01) |
| *H02J 50/80* | (2016.01) |

(52) U.S. Cl.
CPC ............ *H02H 9/005* (2013.01); *H02J 7/025* (2013.01); *H02J 50/10* (2016.02); *H02J 50/80* (2016.02); *H02J 50/90* (2016.02)

(58) Field of Classification Search
CPC .......... H02H 9/005; H02J 50/80; H02J 50/90; H02J 50/10; H02J 7/025
USPC ........................................................ 307/104
See application file for complete search history.

(56) References Cited

U.S. PATENT DOCUMENTS

| | | | |
|---|---|---|---|
| 8,786,135 B2 * | 7/2014 | Wang | H04B 5/0037 307/104 |
| 8,929,043 B2 | 1/2015 | Kim et al. | |
| 9,065,276 B2 | 6/2015 | Kim et al. | |
| 9,130,369 B2 | 9/2015 | Kallal et al. | |
| 9,106,071 B2 | 11/2015 | Kohout | |
| 9,391,469 B2 * | 7/2016 | Kim | H02J 50/40 |
| 9,921,080 B2 | 3/2018 | Pifferi et al. | |
| 10,097,031 B2 * | 10/2018 | Liu | H02J 7/025 |
| 2010/0244767 A1 * | 9/2010 | Turner | H02J 50/12 320/108 |
| 2011/0234010 A1 * | 9/2011 | Bohori | H02J 50/12 307/104 |

(Continued)

FOREIGN PATENT DOCUMENTS

| | | |
|---|---|---|
| CN | 108123515 A | 6/2018 |
| WO | WO 201457343 A1 | 4/2014 |
| WO | WO 2017200282 A1 | 11/2017 |

*Primary Examiner* — Alfonso Perez Borroto
(74) *Attorney, Agent, or Firm* — Cozen O'Connor (57) ABSTRACT

A wireless power system providing protection from overvoltage conditions. A wireless power receiver has one or more magnets to allow detection of a distance of the wireless power receiver from a wireless power transmitter using a Hall effect sensor. When the detected distance is less than a determined threshold, the wireless power transmitter is instructed to transmit power. The wireless power receiver has one or more transient voltage suppression (TVS) diodes communicatively connected so that when a determined operating voltage of a protected portion of the receiver is exceeded, the TVS diodes provide a low impedance path for transient current to divert the transient current away from the protected portion of the receiver. When the wireless power receiver detects an overvoltage condition, the receiver sends a reset command to the wireless power transmitter.

13 Claims, 7 Drawing Sheets

(56) References Cited

U.S. PATENT DOCUMENTS

| | | | | |
|---|---|---|---|---|
| 2011/0248571 A1* | 10/2011 | Kim | ................ | H02J 5/005 |
| | | | | 307/104 |
| 2011/0266881 A1* | 11/2011 | Kim | ................ | H02J 50/12 |
| | | | | 307/104 |
| 2012/0050931 A1* | 3/2012 | Terry | ................ | H02H 9/04 |
| | | | | 361/91.5 |
| 2012/0223591 A1 | 9/2012 | Cheon et al. | | |

\* cited by examiner

WIRELESS POWER SYSTEM WITH PROTECTION FROM OVERVOLTAGE CONDITIONS

BACKGROUND

Technical Field

The present disclosure generally relates to protecting a wireless power receiver from overvoltage conditions.

Description of the Related Art

Receiver overvoltage can arise in wireless power transfer systems. In some cases, a receiver can be surrounded by a large electromagnetic field and can be potentially damaged from the large voltage generated in the receiver coil. Conventional methods to limit the voltage on the receiver input include adding clamping capacitance or fully clamping the signal with a short circuit switch. These conventional approaches all involve cutting the receiver-to-transmitter communication, which creates an anomalous situation in the system that can lead to abnormal transmitter overcurrent or long duration of the overvoltage transient.

BRIEF SUMMARY

A wireless power system providing protection from overvoltage conditions may be summarized as including a wireless power transmitter comprising a Hall effect sensor. The system further includes a wireless power receiver including one or more magnets to allow detection of a distance of the wireless power receiver from the wireless power transmitter using the Hall effect sensor, wherein when the detected distance is greater than a determined threshold, the wireless power transmitter is instructed to stop transmitting power. The wireless power receiver further includes: one or more transient voltage suppression (TVS) diodes communicatively connected so that when an overvoltage condition occurs in which a determined operating voltage of a protected portion of the receiver is exceeded, the TVS diodes provide a low impedance path for transient current to divert the transient current away from the protected portion of the receiver; and at least one processor which executes processor-executable instructions to cause the at least one processor to send a reset command to the wireless power transmitter.

In the system, the at least one processor may send the reset command to the wireless power transmitter when the wireless power receiver detects that a duration of the overvoltage condition has exceeded a determined time period. A voltage across the protected portion of the receiver may be limited to a clamping voltage of the one or more TVS diodes. The one or more TVS diodes may return to a high impedance state after the transient current passes. The one or more TVS diodes may be connected in an anti-series arrangement in the receiver. The wireless power transmitter may include a charging stand and the wireless power receiver may include a mobile device. The wireless power receiver may communicate with the wireless power transmitter by modulating an impedance.

A method for providing protection from overvoltage conditions in a wireless power system, which includes a wireless power transmitter having a Hall effect sensor and a wireless power receiver, may be summarized as including detecting a distance of the wireless power receiver from the wireless power transmitter using one or more magnets in the wireless power receiver and the Hall effect sensor, wherein when the detected distance is greater than a determined threshold, the wireless power transmitter is instructed to stop transmitting power. The method further includes: providing a low impedance path to divert transient current away from a protected portion of the receiver, the wireless power receiver comprising one or more transient voltage suppression (TVS) diodes communicatively connected so that when an overvoltage condition occurs in which a determined operating voltage of a protected portion of the receiver is exceeded, the TVS diodes provide the low impedance path; and sending, by at least one processor of the wireless power receiver, a reset command to the wireless power transmitter.

In the method, the at least one processor may send the reset command to the wireless power transmitter when the wireless power receiver detects that a duration of the overvoltage condition has exceeded a determined time period. A voltage across the protected portion of the receiver may be limited to a clamping voltage of the one or more TVS diodes. The one or more TVS diodes may return to a high impedance state after the transient current passes. The one or more TVS diodes may be connected in an anti-series arrangement in the receiver. The wireless power receiver may communicate with the wireless power transmitter by modulating an impedance.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, certain structures associated with light emitting diodes (LEDs), drive circuits, integrated circuits and fabrication equipment have not been shown or described in detail to avoid unnecessarily obscuring descriptions of the implementations.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations Reference throughout this specification to "one implementation" or "an implementation" or "one embodiment" or "an embodiment" means that a particular feature, structure or characteristic described in connection with the embodiment is included in at least one implementation or at least one embodiment. Thus, the appearances of the phrases "one implementation" or "an implementation" or "in one embodiment" or "in an embodiment" in various places throughout this specification are not necessarily all referring to the same implementation or the same embodiment. Furthermore, the particular features, structures, or characteristics may be combined in any suitable manner in one or more implementations or in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations or embodiments.

In wireless inductive power transfer systems, energy is transferred from an primary coil to a secondary coil using an alternating magnetic field. The efficiency of an inductive link depends on the magnetic coefficient of coupling, k, which is a function of the geometric parameters of the link, e.g., the coil size and shape and the coil separation distance. The coupling coefficient is typically used to represent the efficiency of energy transfer from the transmitter coil to the receiver coil. This coupling coefficient is given by the expression in terms of the mutual inductance (M) and the self-inductances ($L_1$, $L_2$) of the coils: $k=M/\sqrt{L_1 L_2}$. The power coupling is seen in the transmitter is a product of the mutual inductance M and the current $I_2$ flowing in the receiver. At the receiver, power coupling is due to the current $I_1$ flowing in the transmitter being coupled through the mutual inductance as well.

Generally speaking, a wireless power transmitter limits the amplitude of its power signal (or magnetic field strength) such that it does not generate a rectified voltage higher than 20 Volts at the output of a properly-designed power receiver. In general, the power signal depends on the amount of current running through the primary coil. The current is primarily determined by the operating point of the power transmitter, the load impedance of the power receiver, and the coupling between the primary coil and the secondary coil. The power receiver can, to a certain extent, control its load impedance and the operating point of the power transmitter by transmitting appropriate control error packets. However, the power receiver and do little to control the coupling. Consequently, in some cases, there may be a higher-than-expected voltage at an output of the power receiver.

Typically, a user initially places the power receiver at a position where the coupling is poor and subsequently moves it to a position where the coupling is strong. In practice, this can happen when the user keeps the power receiver hovering at a small distance above the interface surface before setting it down or when the user places the power receiver with a large misalignment between the primary coil and the secondary coil and subsequently slides it into better alignment. In either case, the power transmitter can detect the power receiver and establish communications before the coils are properly aligned. The power receiver can then start to control its output voltage to a higher level, e.g., 12 Volts, to prepare for connecting its load. If the coupling is poor, the power receiver typically can reach its target voltage only by driving the power transmitter to use a high primary coil current and, therefore, a strong power signal or high magnetic field. If the coupling suddenly improves substantially, as in the above scenarios, the power receiver does not have time to drive the power transmitter back to a lower primary coil current. As a result, its output voltage can substantially increase, e.g., by up to tens of Volts, thereby generating a strong overvoltage event on receiver side that could damage the receiver integrated circuit (IC). The implementations described herein provide a solution for handling overvoltage conditions arising from a rapidly increase in coupling factor, thereby protecting the receiver IC from dangerous overvoltage conditions.

Figure 1:
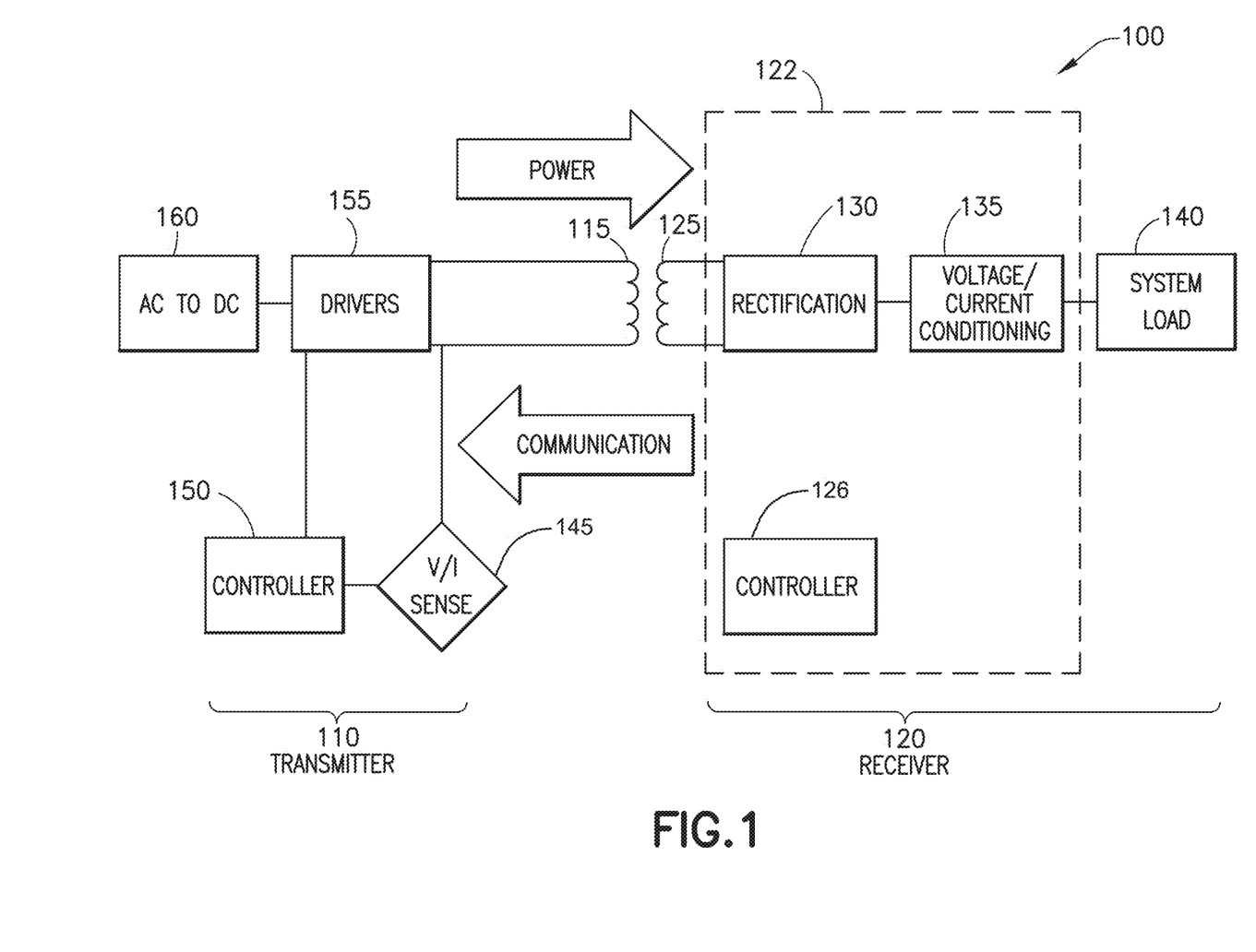
FIG. 1 is a block diagram of a wireless power transmission system.

FIG. 1 is a block diagram of a wireless power system 100, including a wireless power transmitter 110 and a wireless power receiver 120. The system 100 uses inductive coupling to transfer energy via an electromagnetic field between the wireless power transmitter 110 and the wireless power receiver 120. In implementations of the wireless power transmission system 100, the wireless power transmitter 110 may be, for example, a charging pad or stand and the wireless power receiver 120 may be, for example, a mobile device, such as a mobile phone or handheld barcode reader. In such a case, the transmitter coil 115 may be implemented as wire coils in the charging stand and the receiver coil 125 may be implemented as a printed antenna in an integrated circuit of the mobile device. The transmitter coil 115 and the receiver coil 125 magnetically couple to each other when the mobile device is placed on the charging stand. Power is transferred by transformer action between the coils. In embodiments, the power receiver 120 can control the amount of power transferred by instructing the power transmitter 110 to change the field strength by changing the frequency, duty cycle, or voltage rail energizing the transmitter coil 115.

After power is applied to the wireless power transmitter 110, e.g., by an AC-to-DC converter 160, and the transmitter 110 comes out of a reset mode, it can automatically begin a process of detecting and powering the wireless power receiver 120. The wireless power transmitter 110 sends a "ping" to detect the presence of a wireless power receiver 120. After a receiver 120 is detected, the transmitter 110 attempts to establish communication and begin power transfer. The controller 150 controls drivers 155, e.g., a full-bridge power stage, to drive the transmitter coil 115. It regulates the power being delivered to the wireless power receiver 120 by modulating the supply voltage of the power stage while operating at a constant frequency.

When the transmitter coil 115 is positioned near the receiver coil 125, magnetic coupling occurs when the transmitter coil 115 is driven, i.e., magnetic flux is coupled into the receiver coil 125, which induces a voltage and causes current to flow. The secondary voltage, i.e., the voltage induced in the receiver coil 125, is rectified by a voltage rectifier 130 in the power receiver 120. In addition, voltage/current conditioning circuit 135 may apply regulation/conditioning to the received voltage and/or current before the power is delivered to the system load 140, e.g., the battery of a mobile device. Implementations of the wireless power receiver 120 may include a self-contained wireless power receiver integrated circuit (IC) 122 designed to operate in the Wireless Power Consortium (WPC) Qi protocol, such as, for example, the bq51025 produced by Texas Instruments Inc.

There is communication within the wireless power system 100 from the wireless power receiver 120 to the wireless power transmitter 110, whereby the wireless power receiver 120 instructs the wireless power transmitter 110 to send power and how much power to send. Also, to perform voltage regulation, the wireless power receiver 120 must communicate with the wireless power transmitter 110 to instruct it whether to increase or decrease frequency. The communication is controlled by a controller 126 of the wireless power receiver 120. In implementations, the wireless power receiver 120 monitors the output of the rectifier 130 and, using amplitude modulation (AM), sends packets of information to the wireless power transmitter 110.

The wireless power receiver 120 communicates with the wireless power transmitter 110 by modulating the load seen by the wireless power transmitter 110. This load modulation results in a change in the primary coil (i.e., transmitter coil 115) current and/or voltage, which is measured, demodulated, and decoded by the wireless power transmitter 110. The modulated impedance network of the wireless power receiver 120 can be resistive or capacitive. In the resistive modulation approach, a resistor is periodically added to the load, resulting in amplitude change in the transmitter voltage. In the capacitive modulation approach, a capacitor is periodically added to the load, resulting in amplitude change in the transmitter voltage. In implementations, the system communication is digital, i.e., digital data packets are transferred from the wireless power receiver 120 to the wireless power transmitter 110. Differential bi-phase encoding may be used for the packets, with a bit rate of, e.g., 2 kb/s. Various types of communication packets may be used, such as, for example, identification and authentication packets, error packets, control packets, power usage packets, and end power transfer packets, etc.

In disclosed implementations, when the wireless power receiver 120, e.g., a mobile device, is placed near the wireless power transmitter 110, e.g., a charging stand, the receiver coil 125 couples to the magnetic flux generated by the transmitter coil 115, which consequently induces a voltage in the receiver coil 125. The wireless power receiver 120 measures the voltage at the rectifier 130 and calculates the difference between the actual voltage and a desired voltage. The wireless power receiver 120 sends an error packet indicative of the measured voltage differential to the wireless power transmitter 110 by modulating an impedance network. This load, i.e., impedance, modulation results in a change in the transmitter coil 115 current and/or voltage, thereby producing in amplitude modulated (AM) signal. This AM signal "reflects back" to the wireless power transmitter 110 as a change in the voltage amplitude on the transmitter coil 115. The signal is measured, e.g., by a voltage/current sense circuit 145, demodulated and decoded by a controller 150, which controls the drivers 155 to adjust the voltage, thereby completing a regulation control loop. This process goes on until the input voltage settles at the desired value. The wireless power receiver 120 continues to monitor the input voltage and send control error packets (CEP) to the wireless power transmitter 110 at an interval of, e.g., every 250 ms.

As discussed above, if a user positions a wireless power receiver 120 with a large misalignment between the transmitter coil 115 and receiver coil 125, the wireless power transmitter 110 may detect the wireless power receiver 120 and establish communications before the coils are properly aligned. In such a case, the transmitter coil 115 and the receiver coil 125 will have a low coupling factor, and the wireless power receiver 120 can reach its target voltage only by driving the wireless power transmitter 110 to use a relatively high power signal. If the user moves the wireless power receiver 120 into better alignment with the wireless power transmitter 110, the coupling factor will suddenly improve substantially. Significant coupling variation can also happen if a metal object is positioned between the transmitter coil 115 and the receiver coil 120. If this occurs, the wireless power receiver 120 may not have time to drive the wireless power transmitter 110 back to a lower transmitter coil 115 current. In other words, the control loop may not be fast enough to compensate for coupling factor variations faster than about 200-300 ms. As a result, the output voltage of the wireless power receiver 120 will substantially increase (because it depends linearly on the coupling factor and transmitter generated magnetic field), thereby generating a strong overvoltage event on the receiver side of the system 100 that could damage the receiver IC 122.

Figure 2:
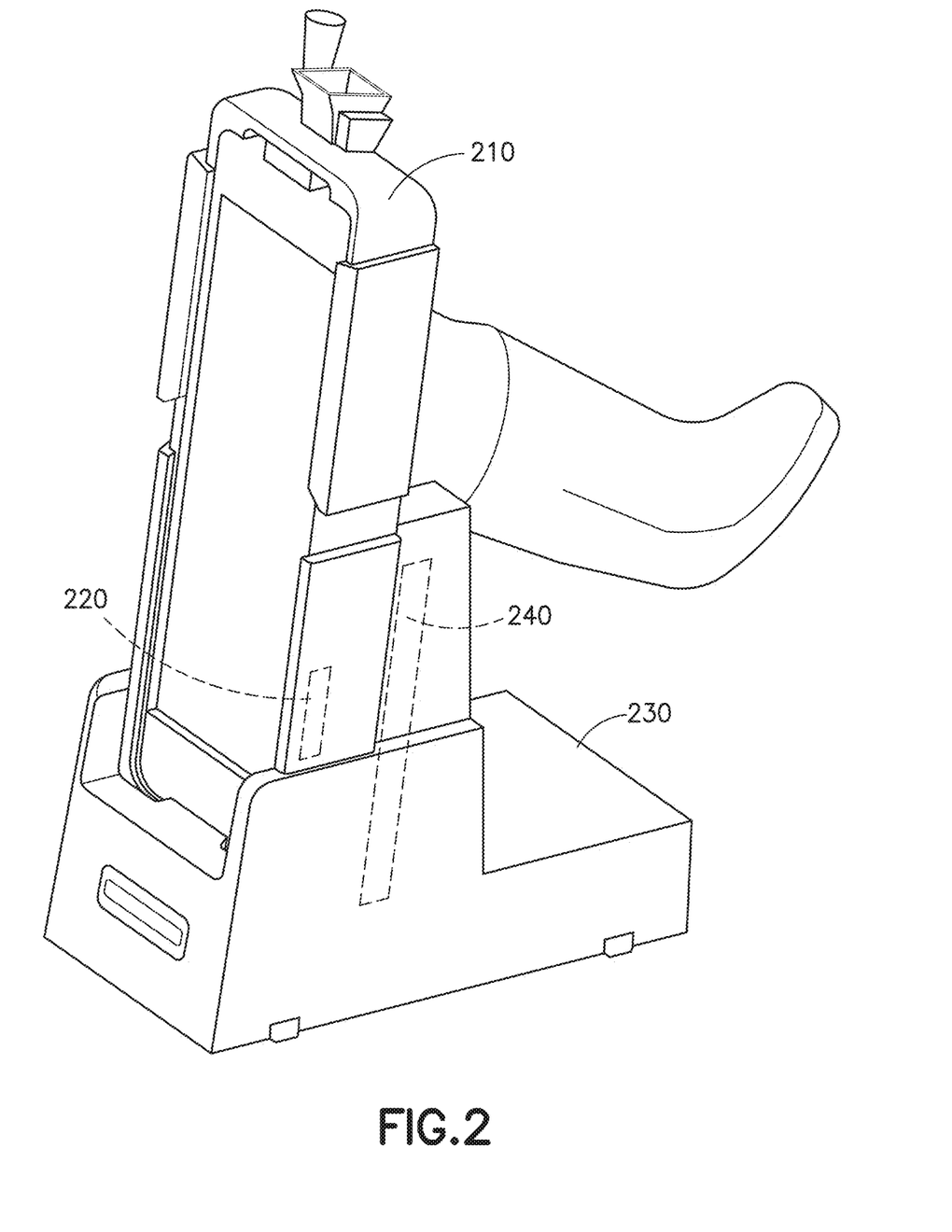
FIG. 2 is a perspective view of a mobile phone which is equipped with a permanent magnet and positioned in a wireless charging apparatus having a Hall effect sensor, according to one illustrated implementation.

FIG. 2 depicts an implementation in which a mobile phone 210 equipped with a permanent magnet 220 is positioned in a wireless charging stand 230 having a Hall effect sensor 240. A Hall effect sensor 240 is a transducer having an output voltage which varies in response to a magnetic field. Typically, a Hall effect sensor has a thin strip of metal with a current applied along it. In the presence of a magnetic field, such as the one produced by the permanent magnet 220 and the mobile phone 210, electrons in the metal strip are deflected toward one edge, thereby producing a voltage gradient across the short side of the strip (i.e., perpendicular to the feed current). Hall effect sensors have an advantage over inductive sensors in that they can be used to detect static magnetic fields. The Hall effect sensor 240 operates as an analog transducer, directly returning a voltage. Therefore, given a known magnetic field produced by the magnet 220, its distance from the Hall effect sensor 240 and, hence, the distance of the mobile phone 210, can be determined. Using groups of sensors, the relative position of the magnet can be deduced.

In disclosed embodiments, a wireless power receiver 120 is equipped with one or more permanent magnets to allow detection of a position of the wireless power receiver 120, relative to the wireless power transmitter 110, using a Hall effect sensor 240. The system 100 may be implemented so that only when the wireless power terminal 110 is well positioned, and therefore the coupling factor with respect to the wireless power receiver 120 is at nominal value, i.e., a determined threshold, the Hall effect sensor is activated, thereby causing the transmitter 110 electronics to switch on to generate the magnetic field. For example, if the mobile phone 210 is lifted up or otherwise moved away from a proper fit with the wireless charging stand 230, resulting in a substantial reduction in the coupling factor, the disclosed implementations provide for shutting down the charging stand to maintain the safety of the mobile phone 210. A shutdown of the wireless charging stand 230 is performed to avoid a scenario in which the transmitted power is substantially increased just before the mobile phone 210 is suddenly placed back in its proper position in the charging station 230, as this would result in an overvoltage situation, as described above.

Figure 3:
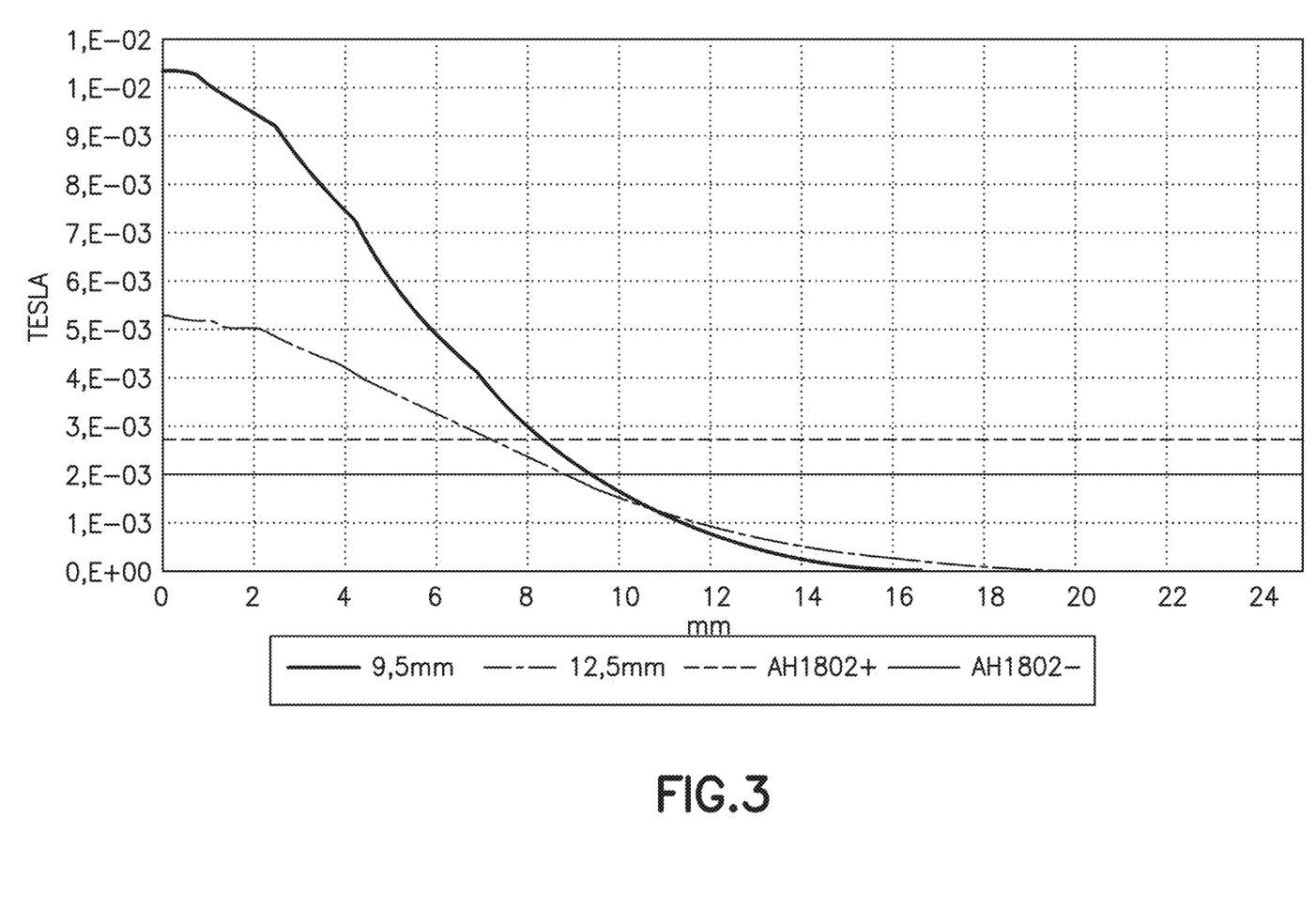
FIG. 3 is a plot of measured magnetic field, as determined by a Hall effect sensor installed in a wireless charging stand, as a mobile phone is moved away from its proper position in the charging stand, according to one illustrated implementation.

FIG. 3 is a plot of measured magnetic field, as determined by a Hall effect sensor installed in a wireless charging stand 230, as a mobile phone 210 is moved away from its proper position in the charging stand 230. In the example of FIG. 3, four different types of Hall effect sensors are tested. As noted above, the voltage output of a Hall effect sensor 240 varies in response to a magnetic field. Therefore, by measuring a voltage output of the Hall effect sensor 240 as the mobile phone 210 is moved away from the charging stand 230 by a measured distance, a magnetic field can be computed therefrom and plotted against the distance of the mobile phone 210 from the charging stand 230. The distance between the mobile phone 210 and the charging stand 230 can be correlated with a voltage generated by the charging stand 230 to determine a maximum voltage threshold which, in turn, can be used to determine a distance threshold. The distance threshold, i.e., the maximum distance within which acceptable voltage levels are generated by the charging stand 230, can be correlated with a voltage output of the Hall effect sensor 240. This allows for the design of a cutoff circuit with the proper parameters to shut off the charging stand 230 at the desired distance threshold.

Figure 4:
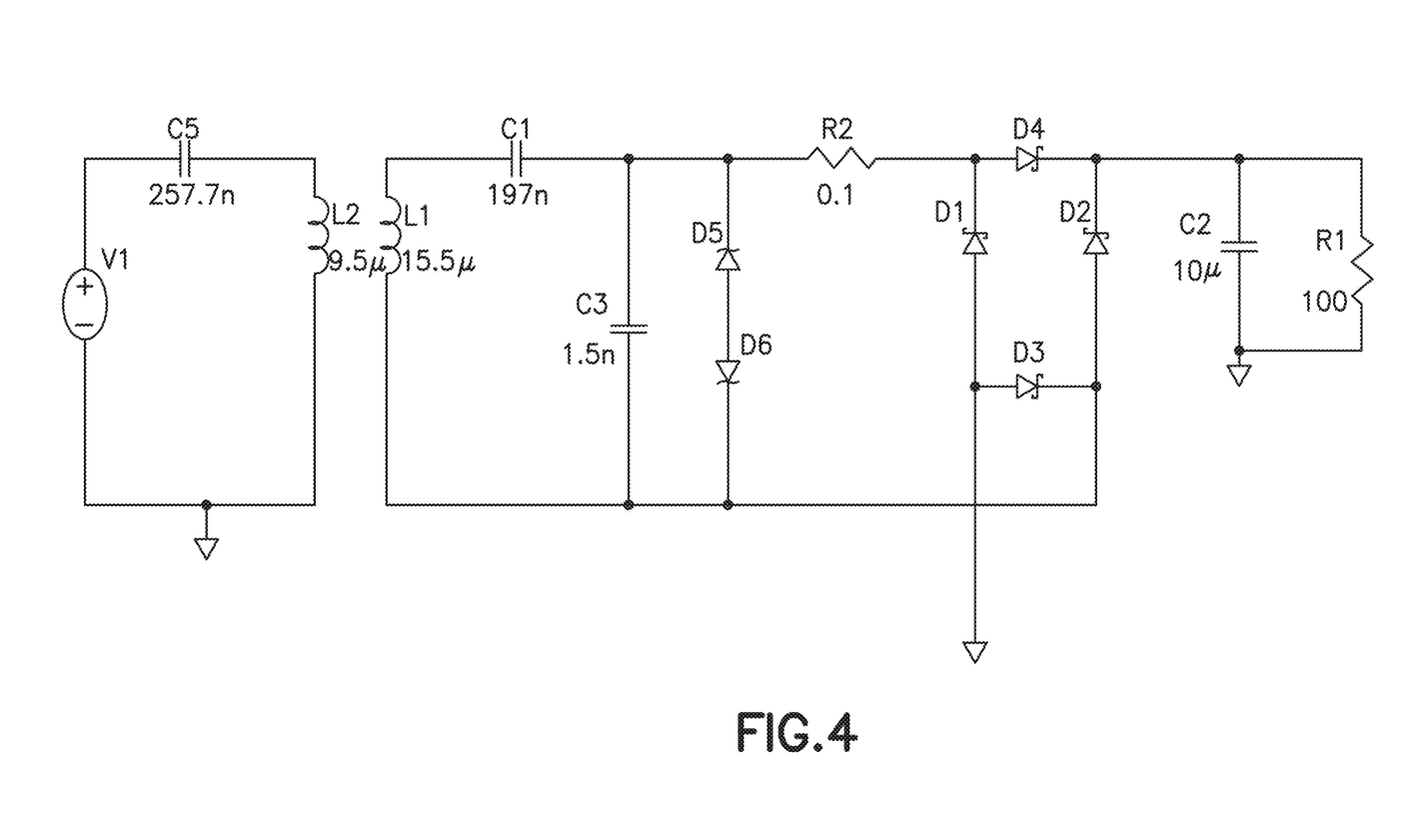
FIG. 4 is a schematic circuit diagram of an overvoltage protection circuit using transient voltage suppression (TVS) diodes, according to one illustrated implementation.

FIG. 4 is a schematic circuit diagram of an overvoltage protection circuit using transient voltage suppression (TVS) diodes. A TVS diode operates by shunting excess current when an induced voltage exceeds an avalanche breakdown potential. In other words, it is a clamping device which suppresses voltages above its breakdown voltage. Under normal operating conditions, the TVS diode presents a high impedance to the protected circuit, i.e., the device essentially appears as an open circuit. When a normal operating voltage of a protected circuit is exceeded, the TVS diode junction avalanches, thereby providing a low impedance path for the transient current. As a result, the transient current is diverted away from the protected components and shunted through the TVS diode. The voltage across the protected circuit, i.e., the protected portion of the receiver 120, is limited to the clamping voltage of the TVS diode. The TVS diode returns to a high impedance state after the transient threat, e.g., overvoltage condition, passes.

In the implementation depicted in FIG. 4, two TVS diodes (D5, D6) are connected in an anti-series configuration in the receiver 120 front-end to provide bidirectional protection for overvoltage conditions. In disclosed embodiments, the TVS diode protection is used in conjunction with the Hall effect sensor arrangement discussed above to provide protection in scenarios which would not be detected a Hall effect sensor circuit. For example, if a metal object were to become lodged between the transmitter coil 115 and the receiver coil 125, the resulting coupling factor would be reduced, possibly substantially reduced. This would result in an increase in the voltage output by the wireless power transmitter 110, which would expose the wireless power receiver 122 and overvoltage condition if the metal object were to be removed. In such a case, the Hall effect sensor arrangement discussed above would be affected only in a negligible way by the metal object and therefore would not detect the overvoltage condition and, consequently, would not shut off the transmitter.

Figure 5:
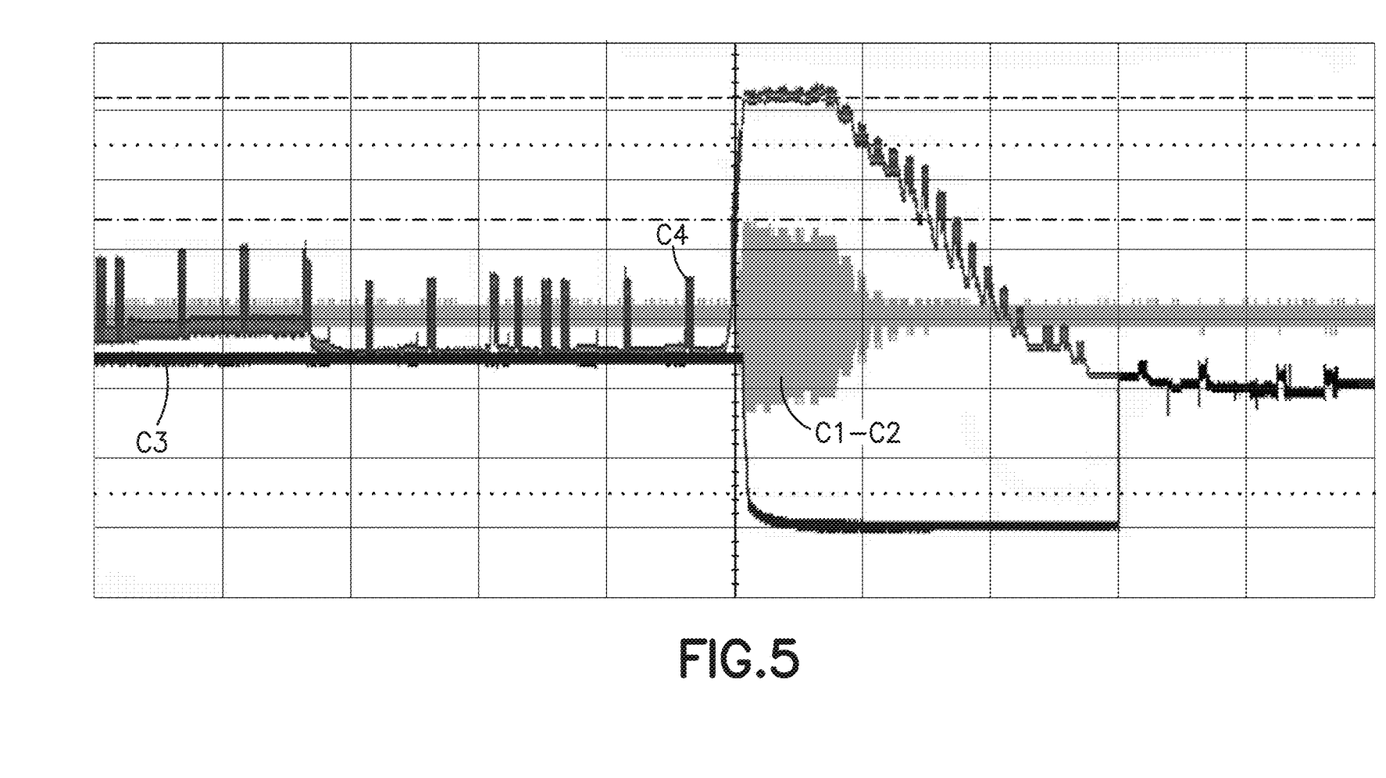
FIG. 5 is a plot of measured voltages in the wireless power receiver during an overvoltage event showing the clamping action of the transient voltage suppression (TVS) protection, according to one illustrated implementation.

FIG. 5 is a plot of measured voltages in the wireless power receiver 120 during an overvoltage event showing the clamping action of the transient voltage suppression (TVS) protection. In the plot, C1-C2 indicates the current that flows through the TVS diodes (D5, D6) during the clamping phase, C4 indicates the rectified voltage on resistor R1 (which corresponds, in implementations, to the rectified voltage on the system load 140 depicted in FIG. 1), and C3 indicates the regulated output voltage of the wireless power receiver 120. When the voltage across the receiver coil 125 exceeds the avalanche breakdown voltage, branch of the circuit containing the TVS diodes (D5, D6) becomes a short circuit, thereby clamping the voltage across the receiver coil 125. It is worth noting that communication from the wireless power receiver 120 to the wireless power transmitter 110 continues during the overvoltage event.

Figure 6:
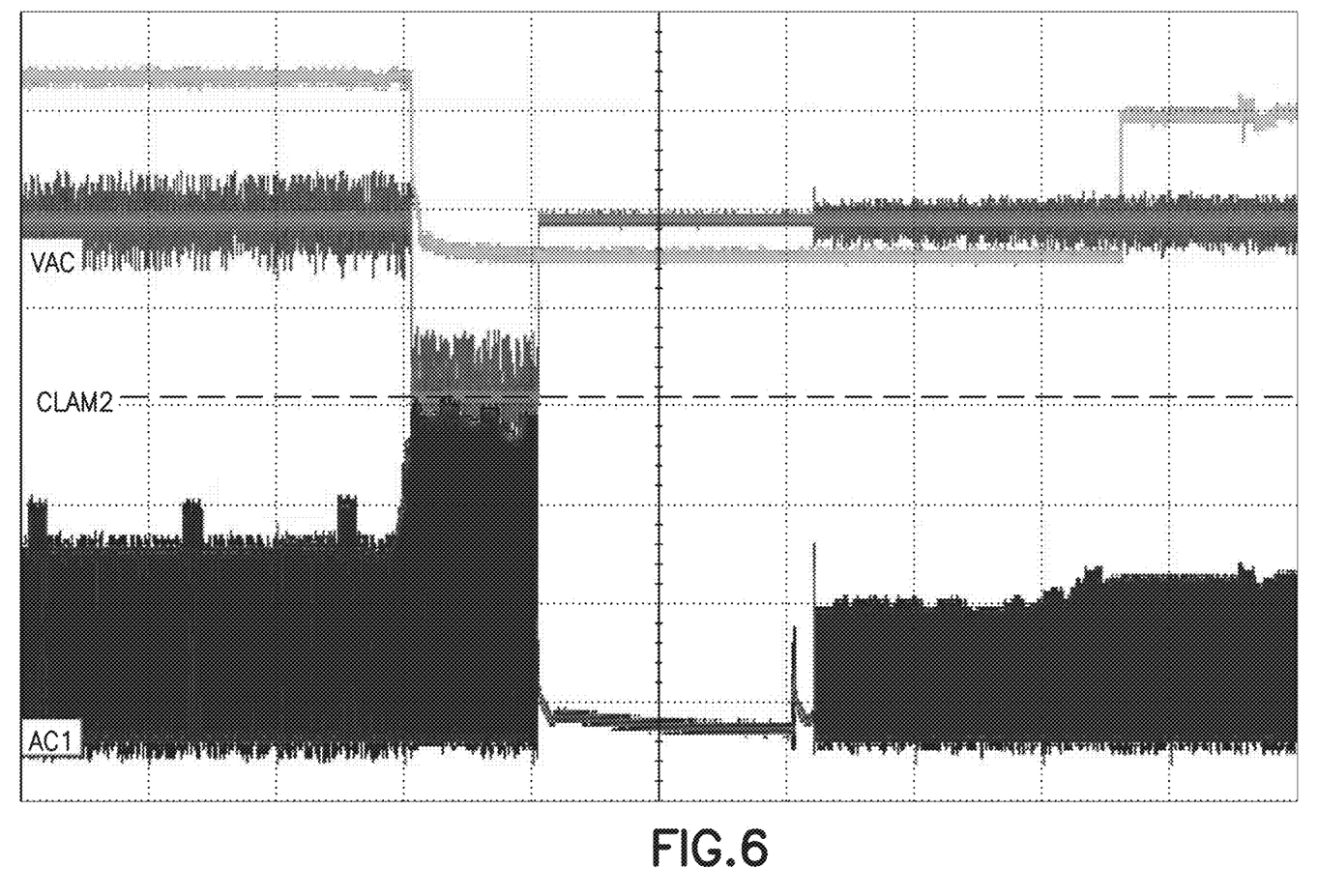
FIG. 6 is a plot of measured voltages in the wireless power receiver during an overvoltage event in which a reset command is sent to the wireless power transmitter, according to one illustrated implementation.

FIG. 6 is a plot of measured voltages in the wireless power receiver 120 during an overvoltage event in which a reset command is sent to the wireless power transmitter 110. Because the TVS diodes dissipate a large amount of power, it is necessary to limit the duration of an overvoltage event. As shown in the example of FIG. 5, the duration of an overvoltage transient can be around 500-1000 ms before the control loop of the wireless power transmitter 110 can make the necessary adjustments to end the overvoltage event. During this time the TVS diodes (D5, D6) need to handle a large amount of power, which generates an elevated junction temperature.

To limit the duration of the overvoltage transient, when the wireless power receiver 120 detects that the overvoltage condition lasts more than, e.g., 10 ms, it can send an interrupt to a microprocessor (not shown), e.g., a microprocessor of a mobile phone 210 being charged. The microprocessor sends a specific command to the receiver IC 122 instructing it to reset the wireless power transmitter 110, i.e., the controller 150 of the transmitter 110. This approach makes it possible to reset the wireless power transmitter 110 in about 150-250 ms, thereby limiting the junction temperature of the TVS diodes (D5, D6) and preventing damage to the protection electronics and the receiver IC 122. As shown in FIG. 6, the AC level, i.e., the voltage across the receiver coil 125, grows very quickly and is clamped at about 16 Volts due to the clamping protection provided by the TVS diodes (D5, D6). After about 200 ms, the receiver IC 122 sends a reset command to the controller 150 in the wireless power transmitter 110, which resets immediately and then restarts shortly thereafter.

Figure 7:
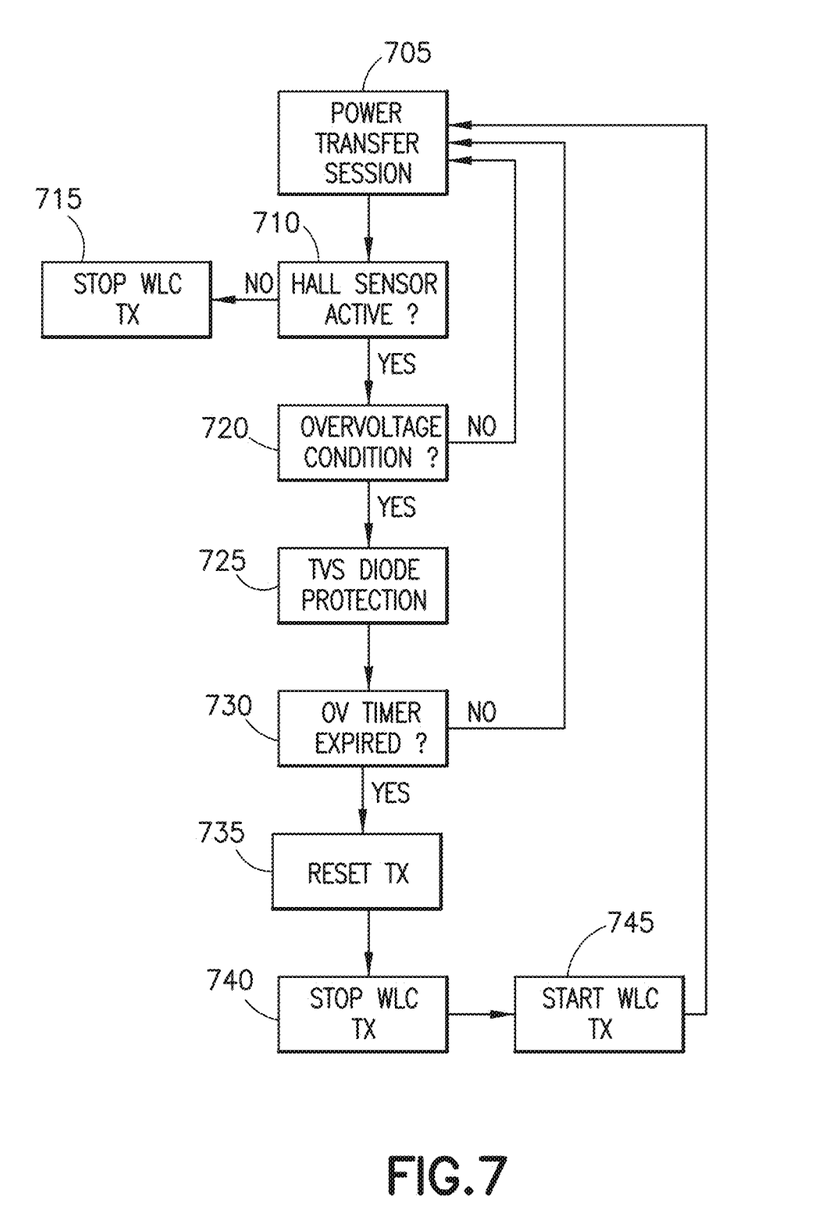
FIG. 7 is a flow diagram for a method of protecting a wireless power receiver from an overvoltage condition, according to one illustrated implementation.

FIG. 7 is a flow diagram for a method of protecting a wireless power receiver from an overvoltage condition. A power transfer session is initiated (or an already initiated session continues) between a wireless power transmitter 110 and a wireless power receiver 120 (step 705). As discussed above, this may occur when the transmitter 110 and the receiver 120 are brought into proximity and the transmitter 110 sends a ping to detect the presence of the receiver 120. After the receiver 120 is detected, the transmitter 110 attempts to establish communication and begin the power transfer. A Hall effect sensor 240 installed in the transmitter 110 is checked to determine whether it is active, i.e., whether it is outputting a voltage signal indicating that the receiver 120 is in proximity to the transmitter 110 (step 710).

If the Hall effect sensor 240 is not active, then transmission by the transmitter 110, e.g., a wireless cradle (WLC), is stopped (step 715). As discussed above, this prevents the transmitter 110 from increasing the voltage output into an overvoltage range in an attempt to overcome a poor coupling factor between the transmitter 110 and the receiver 120. If the Hall effect sensor 240 is active, then a determination is made as to whether an overvoltage condition exists (step 720). In implementations, the existence of an overvoltage condition may not be explicitly detected but, rather, may be implicit in the response of the TVS diodes to the overvoltage condition.

If an overvoltage condition does not exist, then the power transfer session continues (step 705). If an overvoltage condition exists, then the TVS diodes act to control the overvoltage condition, as explained above (step 725). In implementations, a timer may track the duration of an overvoltage condition. A determination is made as to whether the overvoltage timer has expired (step 730). For example, a microprocessor in the device containing the wireless power receiver 120 may perform the timer function. If it is determined that the overvoltage timer has not expired, then the power transfer session continues (step 705). If it is determined that the overvoltage timer has expired, then the microprocessor associated with the receiver 120 issues and instruction to the receiver 120 to reset the transmitter 110 (step 735).

The resetting of the transmitter 110 causes the (WLC) to stop power transmission to the receiver 120 (step 740). At some point following the reset, the transmitter restarts transmission (step 745) and the power transfer session continues (step 705).

In disclosed embodiments, the three different protection techniques discussed above, i.e., the Hall effect sensor, the TVS diode protection circuit, and the overvoltage timer/transmitter reset, work together to ensure proper handling of an overvoltage event. By virtue of these protection features operating in concert, highly effective protection of the wireless power receiver 120 is achieved. Consider, for example, an active wireless power transfer session, where a terminal (e.g., a mobile device or other type of receiver 120) is well coupled with the cradle/stand (or other type of transmitter 110) and the wireless power system is working under normal operating conditions. The Hall effect sensor 240 can detect terminal misalignment and if the terminal is moved away from the nominal position, thereby creating an anomalous coupling condition, the Hall effect sensor 240 stops power transmission by the wireless power transmitter 110. If the Hall effect sensor 240 cannot accurately detect a specific situation (e.g., a metal object lodged between the cradle and the terminal) which results in a sudden substantial change in the coupling factor, the TVS diode protection circuit can ensure a strong degree of protection of the receiver 120.

Typically, an overvoltage event is handled by the transmitter 110 based on communications from the receiver 120 and can be eliminated in a reasonable timeframe, e.g., in 200-300 ms, at which point the voltage is received at the receiver 120 has been decreased to within a normal operating range. If on the other hand, a large overvoltage intensity occurs and has a duration of more than about 400 ms, a microprocessor associated with the receiver 120 instructs the receiver 120 to send a reset command to the transmitter 110 to shut off the transmitter 110 and then re-start the power transfer session.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those of skill in the art will recognize that many of the methods or algorithms set out herein may employ additional acts, may omit some acts, and/or may execute acts in a different order than specified. The various implementations described above can be combined to provide further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A wireless power system providing protection from overvoltage conditions, the system comprising:
   a wireless power transmitter comprising a Hall effect sensor; and
   a wireless power receiver comprising:
   one or more magnets to allow detection of a distance of the wireless power receiver from the wireless power transmitter using the Hall effect sensor, wherein when the detected distance is greater than a determined threshold, the wireless power transmitter is instructed to stop transmitting power;
   the wireless power receiver further comprising one or more transient voltage suppression (TVS) diodes communicatively connected so that when an overvoltage condition occurs in which a determined operating voltage of a protected portion of the receiver is exceeded, the TVS diodes provide a low impedance path for transient current to divert the transient current away from the protected portion of the receiver; and
   at least one processor which executes processor-executable instructions to cause the at least one processor to send a reset command to the wireless power transmitter.

2. The system of claim 1, wherein the at least one processor sends the reset command to the wireless power transmitter when the wireless power receiver detects that a duration of the overvoltage condition has exceeded a determined time period.

3. The system of claim 1, wherein a voltage across the protected portion of the receiver is limited to a clamping voltage of the one or more TVS diodes.

4. The system of claim 1, wherein the one or more TVS diodes return to a high impedance state after the transient current passes.

5. The system of claim 1, wherein the one or more TVS diodes are connected in an anti-series arrangement in the receiver.

6. The system of claim 1, wherein the wireless power transmitter comprises a charging stand and the wireless power receiver comprises a mobile device.

7. The system of claim 1, wherein the wireless power receiver communicates with the wireless power transmitter by modulating an impedance.

8. A method for providing protection from overvoltage conditions in a wireless power system which includes a wireless power transmitter having a Hall effect sensor and a wireless power receiver, the method comprising:

detecting a distance of the wireless power receiver from the wireless power transmitter using one or more magnets in the wireless power receiver and the Hall effect sensor, wherein when the detected distance is greater than a determined threshold, the wireless power transmitter is instructed to stop transmitting power;

providing a low impedance path to divert transient current away from a protected portion of the receiver, the wireless power receiver comprising one or more transient voltage suppression (TVS) diodes communicatively connected so that when an overvoltage condition occurs in which a determined operating voltage of a protected portion of the receiver is exceeded, the TVS diodes provide the low impedance path; and     sending, by at least one processor of the wireless power receiver, a reset command to the wireless power transmitter.

9. The method of claim 8, wherein the at least one processor sends the reset command to the wireless power transmitter when the wireless power receiver detects that a duration of the overvoltage condition has exceeded a determined time period.

10. The method of claim 8, wherein a voltage across the protected portion of the receiver is limited to a clamping voltage of the one or more TVS diodes.

11. The method of claim 8, wherein the one or more TVS diodes return to a high impedance state after the transient current passes.

12. The method of claim 8, wherein the one or more TVS diodes are connected in an anti-series arrangement in the receiver.

13. The method of claim 8, wherein the wireless power receiver communicates with the wireless power transmitter by modulating an impedance.

\* \* \* \* \*